United States Patent

Yang et al.

(10) Patent No.: US 6,516,078 B1
(45) Date of Patent: Feb. 4, 2003

(54) MULTI-LEVEL DETECTION AND DETERRENCE OF COUNTERFEITING OF DOCUMENTS WITH REDUCED FALSE DETECTION

(75) Inventors: Xuguang Yang, Cupertino, CA (US); Poorvi L. Vora, Menlo Park, CA (US); Cormac Herley, Los Gatos, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/363,977

(22) Filed: Jul. 29, 1999

(51) Int. Cl.[7] .................................................. G06K 9/00
(52) U.S. Cl. ........................ 382/100; 382/135; 399/366; 713/176
(58) Field of Search ................................ 382/100, 135, 382/137, 162, 192, 194, 217, 218, 219, 220, 232; 902/6, 7, 14, 17, 21, 28, 40; 434/110; 209/2, 534, 546, 549; 194/206; 713/176, 179, 181; 399/366

(56) References Cited

U.S. PATENT DOCUMENTS

| | | | | |
|---|---|---|---|---|
| 5,216,724 A | * | 6/1993 | Suzuki et al. ................ | 382/135 |
| 5,227,871 A | * | 7/1993 | Funada et al. ............... | 358/500 |
| 5,313,564 A | | 5/1994 | Kafri et al. .................. | 358/1.1 |
| 5,363,454 A | * | 11/1994 | Udagawa et al. ........... | 382/165 |
| 5,638,496 A | | 6/1997 | Sato ............................ | 358/1.9 |
| 5,678,155 A | * | 10/1997 | Miyaza ....................... | 399/366 |
| 5,761,686 A | | 6/1998 | Bloomberg ................. | 707/529 |
| 5,771,315 A | * | 6/1998 | Matsuyama ................. | 382/191 |
| 5,877,963 A | | 3/1999 | Leung et al. ................ | 700/223 |
| 5,946,414 A | | 8/1999 | Cass et al. .................. | 382/183 |
| 5,992,601 A | | 11/1999 | Mennie et al. .............. | 194/207 |
| 6,002,800 A | | 12/1999 | Donelly et al. ............. | 382/216 |
| 6,014,453 A | * | 1/2000 | Sonoda et al. .............. | 382/137 |
| 6,039,246 A | * | 3/2000 | Mukai ......................... | 235/379 |
| 6,104,826 A | | 8/2000 | Nakagawa et al. ......... | 382/100 |
| 6,122,392 A | | 9/2000 | Rhoads ....................... | 382/100 |
| 6,128,411 A | | 10/2000 | Knox .......................... | 382/232 |
| 6,185,404 B1 | * | 2/2001 | Hasuo et al. ................ | 399/366 |
| 6,272,634 B1 | | 8/2001 | Tewfik et al. ............... | 713/176 |
| 6,275,304 B1 | | 8/2001 | Eschbach et al. ........... | 358/1.9 |
| 6,282,328 B1 | | 8/2001 | Desai ........................... | 382/308 |
| 6,343,204 B1 | * | 1/2002 | Yang ........................... | 399/366 |

* cited by examiner

Primary Examiner—Andrew W. Johns
Assistant Examiner—Shervin Nakhjavan

(57) ABSTRACT

Detection and deterrence of counterfeiting permits one to make legitimate color copies without introducing visual artifacts or experiencing substantial processing delays. We enable an efficient counterfeit deterrence by the use of an hierarchic detection scheme, in which the majority of documents are classified as free of suspicion using a simple algorithm that imposes a negligible computational burden. The remainder of documents, which are labeled as suspicious, receive analysis by one or more potentially complex detection algorithms. If the suspicious document is identified as being a secure document, this will lead to printing with selectively deteriorated service or complete denial of service. For one embodiment, the scheme uses a color look-up table (LUT) to detect a characteristic color (or colors) of frequently counterfeited documents and alters the characteristic color in the copies if a more accurate second test verifies that printing of a counterfeit is being attempted. A conventional test for counterfeit documents can be used as a second (or higher) level test. A particularly effective second level detector characterizes a suspicious pattern by the size of the suspected area, and the frequency of the transition between the foreground and background colors.

20 Claims, 7 Drawing Sheets

MULTI-LEVEL DETECTION AND DETERRENCE OF COUNTERFEITING OF DOCUMENTS WITH REDUCED FALSE DETECTION

BACKGROUND OF THE INVENTION

1. Field of the Invention

The present invention relates to printing and, more particularly, to the prevention of printing of counterfeit currency or other documents.

2. Description of the Related Art

Modern technology has made it easy for most people to quickly and inexpensively make accurate color copies of documents. This copying can be achieved through the use of a color copier or by scanning the document and then printing it using a color printer. There are many legitimate uses for this copying technology, however a small percentage of people use color copying to make counterfeit currency or to counterfeit other documents.

One way to prevent counterfeiting is to use techniques such as are taught by Sato, "Color image input apparatus having color image identifying function", U.S. Pat. No. 5,638,496, issued, Jun. 10, 1997. Sato describes a line sensor and image input section that input a color image in a reading area containing an original, an original extracting section that extracts an area of the original from the input image, a normalization section that normalizes an image of the extracted original area to an image of preset size, an image averaging section that converts the normalized image into an averaged image, and a brightness-hue-chroma converting section that converts the averaged image in Vcd images used as color perception amounts of a human being. A pattern matching section collates the Vcd image with dictionary data in a dictionary data storing section to determine whether or not the original is a specified type of original such as a bill, and an image output controlling section then determines whether or not image data output from the color image input section is to be output to the exterior based on the result of the identification.

Thus typical techniques such as searching for a particular pattern or color distribution can be used to detect and stop the copying of a counterfeit document. However, these techniques can be computationally intense and therefore place an undesirable delay on the copying of every document. This delay is particularly undesirable when one realizes that the majority of documents copied are made, not by counterfeiters, but by law-abiding citizens who are copying documents for legitimate purposes.

Thus, it can be seen that current counterfeiting detection and deterrence techniques impose processing delays upon color copying devices, and hinder the use of these devices in many applications.

Therefore, there is an unresolved need for a counterfeiting detection and deterrence technique that permits one to make color copies without imposing processing delays upon color copying devices.

SUMMARY OF THE INVENTION

A method and apparatus is described for detection and deterrence of counterfeiting that permits one to make legitimate color copies without introducing visual artifacts or experiencing substantial processing delays.

We enable an efficient counterfeit deterrence by the use of an hierarchic detection scheme, in which the majority of documents are classified as free of suspicion using a simple algorithm that imposes a negligible computational burden. The remainder of documents, which are labeled as suspicious, receive analysis by one or more additional detection algorithms. If the suspicious document is identified as being a secure document, this will lead to printing with selectively deteriorated service or complete denial of service.

For one embodiment, the scheme uses a color look-up table (LUT) to detect a characteristic color (or colors) of frequently counterfeited documents, and alters the characteristic color in the copies if a second test verifies that printing of a counterfeit is being attempted.

Conventional tests for counterfeit documents can be used as a second (or higher) level test. A particularly effective second level detector characterizes a suspicious pattern by the size of the suspected area, and the frequency of the transition between the foreground and background colors.

Our invention has negligible impact on the time to render a page and negligible effect on general images and documents, while denying printing or generating visible artifacts on banknote images. The scheme can be deployed in a printer driver with no hardware changes and the color modulation image degradation function can be fine-tuned such that the area of the LUT that is classified as suspicious can be adjusted to arrive at a compromise that allows reasonable detection, while giving minimal effect on legitimate users. Furthermore, this method can detect the existing currency in circulation with no redesign or reissue of currency required. Moreover, so long as the characteristic color does not change, no alteration is required for a new series of notes.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1–7. Those skilled in the art will readily appreciate that the detailed description given herein with respect to these figures is for explanatory purposes, however, because the invention extends beyond these limited embodiments.

Figure 1:
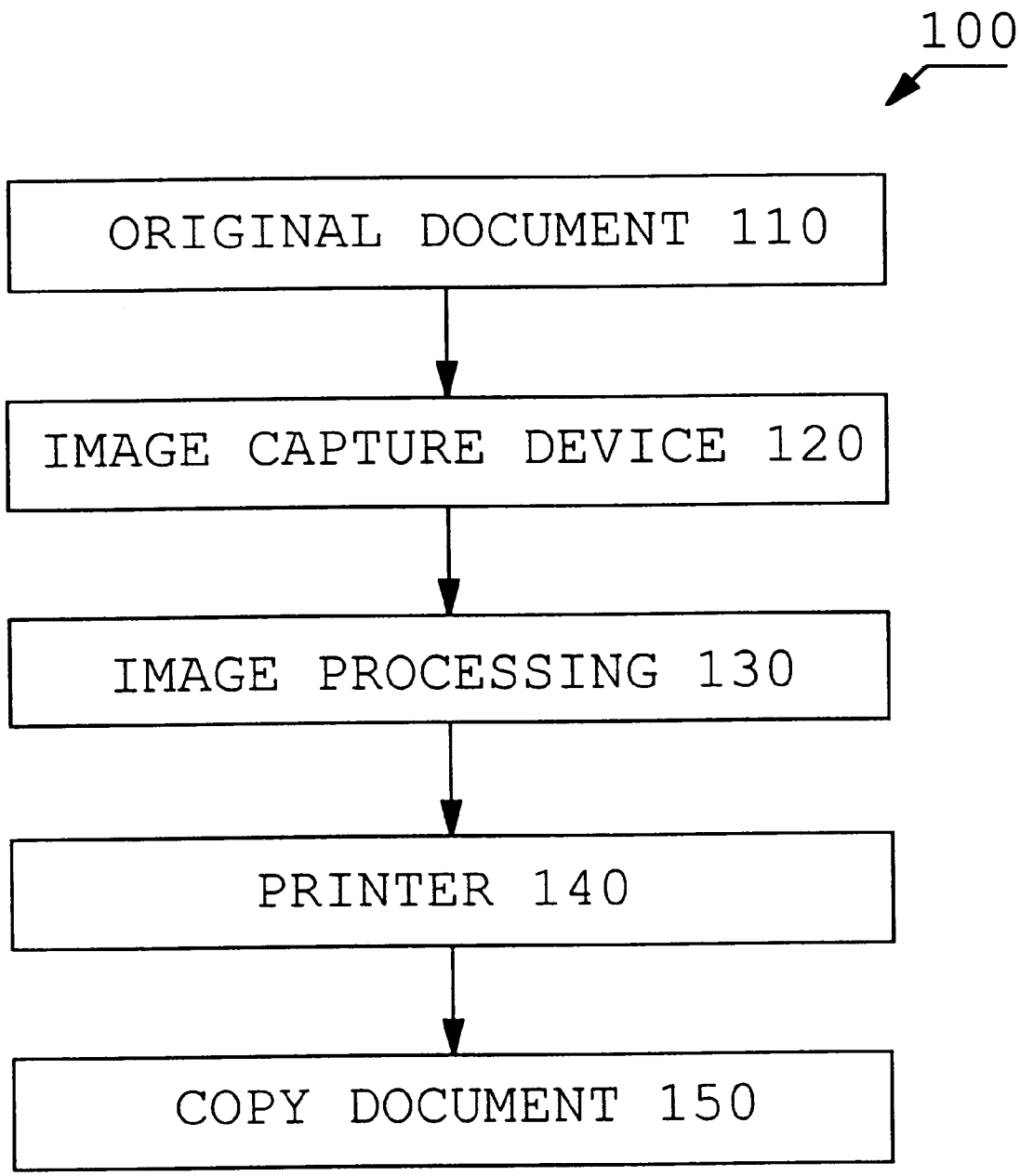
FIG. 1 is a diagram illustrating a color copying system suitable for use with a counterfeiting detection and deterrence scheme according to the present invention.

FIG. 1 is a diagram illustrating a color copying system 100 suitable for use with a counterfeiting detection and deterrence scheme according to the present invention. Image capture device 120 captures an image of original document 110. Image processor 130 processes the image captured by image capture device 120 so that printer 140, can produce copy document 150. As will be explained below in greater detail, image processor 130 has the ability to detect a characteristic color (or colors) within the captured image of original document 110. In the event that a significant amount of a characteristic color is detected and a secondary-level criterion is met, image processor 130 will deny or degrade printing of copy document 150 by printer 140. For example, to degrade printing, image processor 130 may change the characteristic color so that a different color is printed by printer 140 when producing copy document 150. The changed characteristic color will thus identify a copy as being counterfeit.

A banknote is an example of a document having a characteristic color. For example, the back of all U.S. currency has a characteristic color, i.e., "banknote green". Other examples of documents that have a characteristic color and that may be targets of counterfeiters include: identification cards, bonds, or stock certificates.

Image capture device 120, image processor 130 and printer 140 may be separate components as shown in FIG. 1. Image capture device 120 can be a scanner or digital camera, but may also include a device that graphically generates the "captured" image. Image processor 130 can be a dedicated or general purpose computer, and the image processing function can be accomplished by software (for example as a printer driver), by hardware or by firmware. Printer 140 can function by any of a variety of known printing processes using mechanisms such as toner or ink. Alternately, one or more of these components can be combined, for example, as an integral color copier that scans, processes and then prints. Note also that it is possible for the image processing function 130 to be distributed throughout the system. Thus, a portion, or even all, of the image processing function 130 could be accomplished by the image capture device 120 or by the printer 140.

Image processing function 130 permits devices to detect secure documents in order to deter counterfeiting of the secure documents. A difficulty posed by prior detection methods is that detection often requires considerable computational effort by the device. For example, it is feasible to deter counterfeiting of US currency by degrading or denying copying upon detecting the image of the President's face. In practice however, this is impractical because it would involve carefully examining every document, and would considerably slow the time to process a page. Under such a scheme, in order to deter the tiny minority of documents that are possibly counterfeit, one must impose a throughput burden on the vast majority that are legitimate.

We enable an efficient counterfeit deterrence by the use of an hierarchic detection scheme, in which the majority of documents are classified as free of suspicion using a simple algorithm that imposes a negligible computational burden. The remainder of documents, which are labeled as suspicious, receive analysis. by one or more additional detection algorithms. If the suspicious document is identified as being a secure document, this will lead to printing with selectively deteriorated service or complete denial of service.

In the case of counterfeiting a US banknote, a counterfeiter will have to reproduce the following features (among others) with sufficient accuracy to pass a visible inspection:
  Image of the President's face
  Characteristic "banknote green" color
  Fine detail of scrollwork
  Round treasury seal on front of note.

A typical prior-art counterfeit detection mechanism will use a single level of testing to attempt to detect a counterfeit. In a typical conventional detection mechanism, service is denied once a feature that is present only on secure documents is detected. However, the computational effort involved in detecting a feature present only in secure documents can be very high. The allowable rate of false positives (cases where we falsely determine that a secure document feature is present) must also be very low. This is because denial of service is typically not tolerable when legitimate documents are printed. Thus, there are two preferred traits of a feature to be used in a detection mechanism:
  Feature occurs only on secure documents.
  Feature is easily detected.

It is extremely difficult to satisfy both constraints. For example, although an exact copy of the Andrew Jackson portrait on the US $20 bill is unlikely to appear on a legitimate document, the burden of determining that an image is sufficiently different from Jackson to permit copying can be extremely high.

Figure 2:
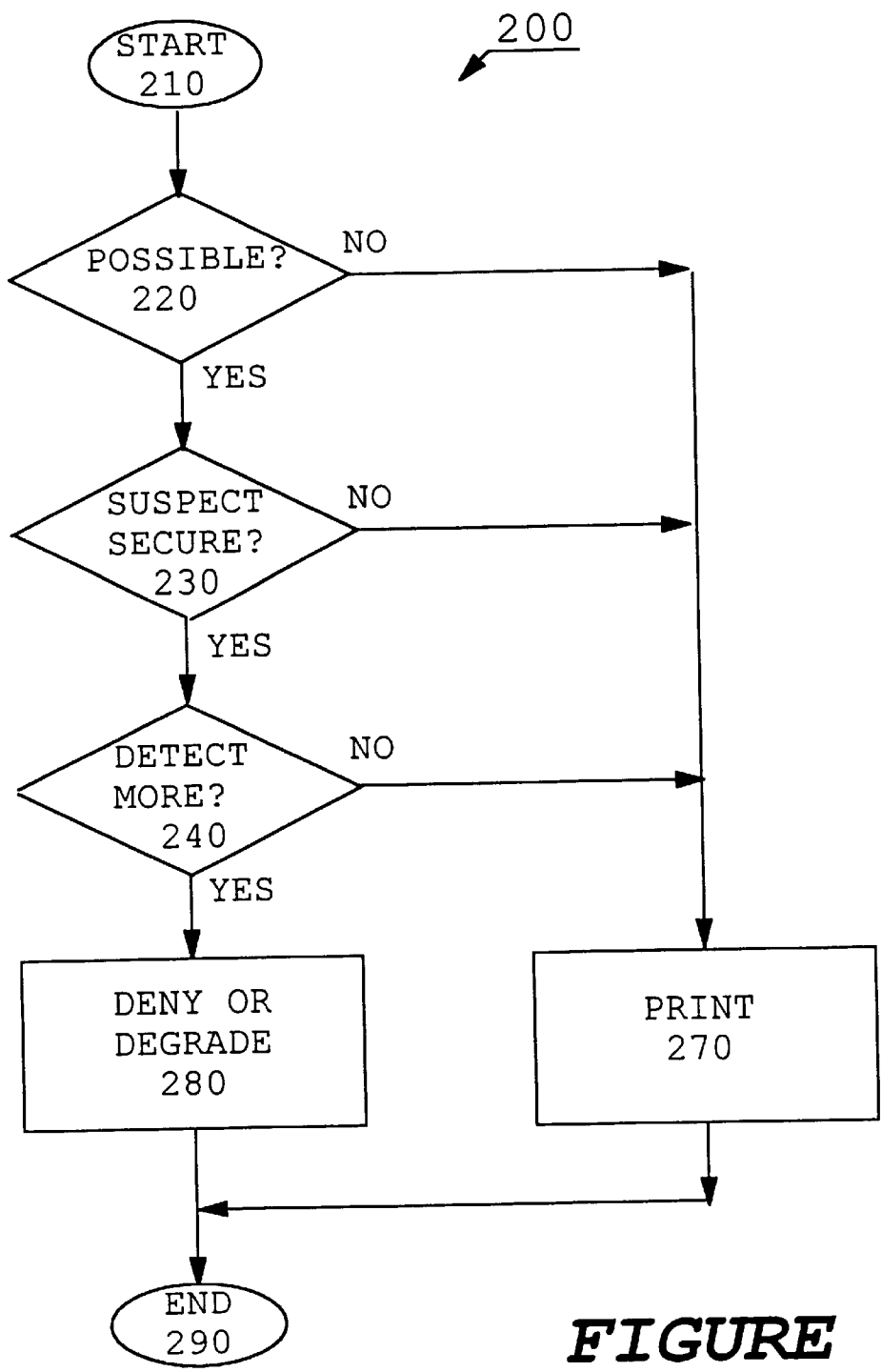
FIG. 2 is a diagram illustrating multi-level detection process flow according to an embodiment of the present invention.

FIG. 2 is a diagram illustrating multi-level detection process flow according to an embodiment of the present invention. The portion of image processing of interest begins at start bubble 210. At decision block 220, a test is made to determine whether or not counterfeiting of a document having a characteristic color is possible. For example, if it is known that the document being copied is to be printed as a black-and-white or grayscale copy, then it is not possible to generate a counterfeit copy of a document having a characteristic color. This is because the copy will not have the characteristic color, so there would be no chance of confusing the non-colored copy with an original. Therefore, to save processing time in a case such as just described, there would be no need to perform color conversion. Note that test 220 is optional and could be eliminated, with the only substantial effect being that processing would occur in every case, with an attendant increase in processing delay.

FIG. 2 illustrates an hierarchic detection mechanism wherein initial detection of a suspicious event causes subsequent, (possibly more complex), detection mechanisms to be invoked. In this case, a first level detection mechanism 230 determines whether the document contains suspicious features or not. Only if the outcome of this test is positive (i.e., suspicious document detected) is the additional, detector 240 invoked to search for the presence of secure features. An advantage of this hierarchic approach is that, because the first detection mechanism sends suspicious documents to a potentially more complex algorithm for further inspection, the first detection mechanism can have a higher false positive rate. If the first level detection correctly classifies the majority of legitimate documents as being "unsuspicious", it will have negligible impact on the majority of documents printed and will still allow a complex detection mechanism to be employed at the second level. Thus, two desirable traits of our first level detection scheme are:
  It has negligible impact on the throughput of the device (for example, the time taken to print a page should be impacted only very slightly)

It correctly classifies the vast majority of legitimate documents as being "unsuspicious" while classifying almost all counterfeit documents as being suspicious.

The second (or higher) level detection mechanism 240 has the trait that it should distinguish accurately the legitimate from the counterfeit documents among all those passed to it as "suspicious." Because this second detector processes only a small portion of the pages printed when the printer is used for legitimate purposes, it can be allowed to have a greater impact on the time taken to process a page than the first level detection. Thus our second level detection scheme can even have far looser constraints than the detection mechanism used in a conventional system. The looser constraints make its design far easier than designing a single mechanism which must process every image as quickly as possible without error. However, the second stage need not be more complex than the first. For some circumstances and tests, it may be sufficient to confirm a suspicious document as a counterfeit attempt after detecting two (or more) different suspicious characteristics in two (or more) respective stages (e.g., one per stage).

If it is determined in decision block 240 that an attempt is being made to print a secure document, then printing is denied or degraded 280 before termination 290. Otherwise, after counterfeiting has been ruled out, the document is printed 270 before termination 290.

Note that second level detection scheme 240 can continue testing the remainder of the page being copied, or alternatively, second level detection scheme 240 can restart at the beginning of the suspicious page, and retest the entire page at the second level.

Also note that it is possible to begin degradation of image quality as soon as a document has been identified by first level detection 230 as being suspicious. Then if it is determined in decision block 240 that an attempt is being made to print a secure document, printing can be denied or further degraded 280 before termination 290.

Otherwise, after counterfeiting has been ruled out, the document is printed 270 with slight (possibly unnoticeable) degradation before termination 290.

Figure 3:
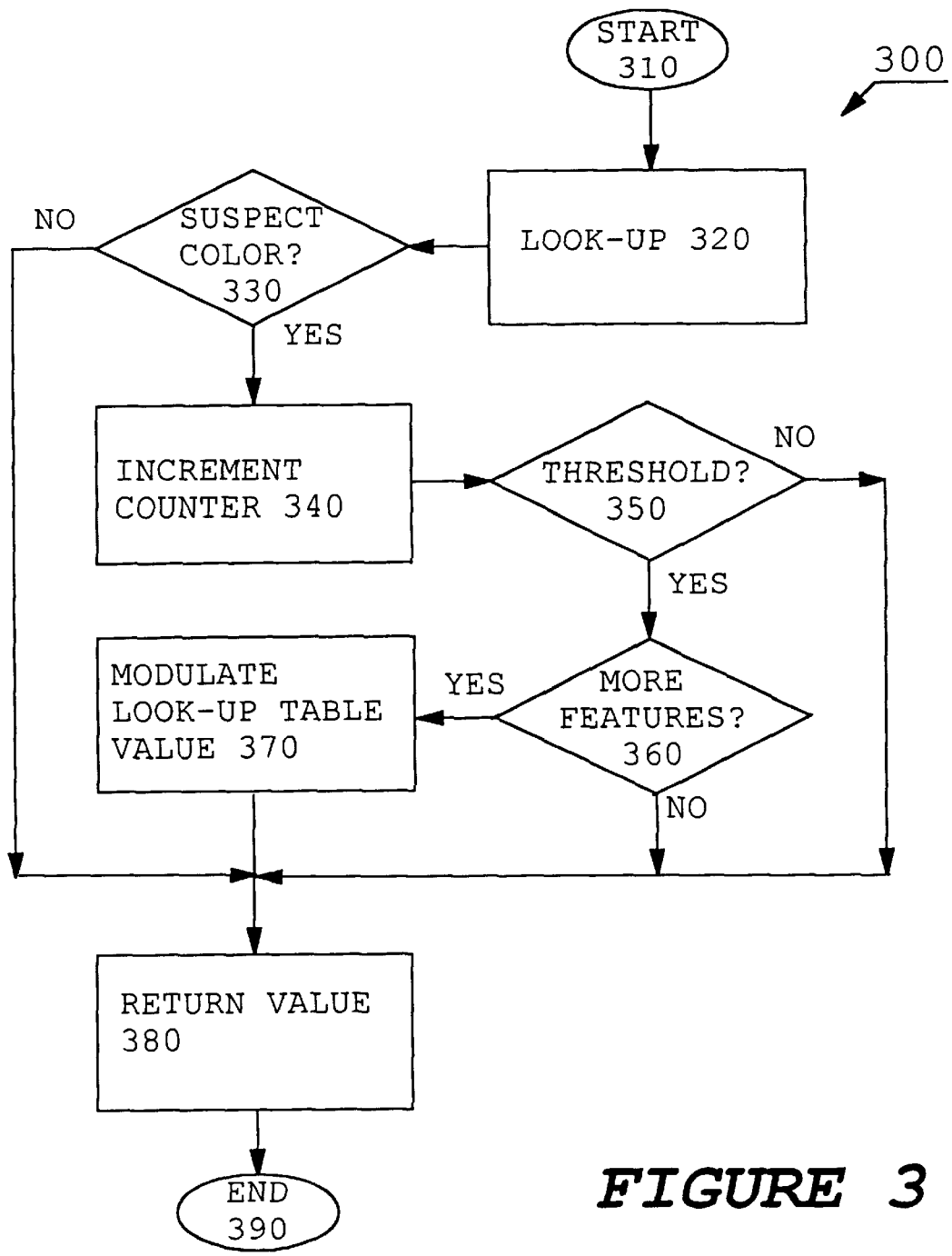
FIG. 3 is a diagram illustrating multi-level detection process flow according to a color look-up table embodiment of the present invention.

FIG. 3 is a diagram illustrating multi-level detection process flow according to a color look-up table embodiment 300 of the present invention. The portion of image processing of interest begins at start bubble 310.

In process block 320 a color look-up is performed for the pixel of interest. That is to say that a color mapping is performed from one color space to another using a color look-up table. For example, an input device may record a captured document using the RGB (red-green-blue) color space, but the printer may print documents using the CMYK (cyan-magenta-yellow-black) color space. If the pixel of interest has a color represented in the RGB color space, a color look-up table (LUT) can be used to find the corresponding CMYK value.

A test is then performed in decision block 330 to determine whether or not the pixel of interest has a suspect color, i.e., a color that is the same or close to the characteristic color of the target counterfeit document. If the color look-up is for some color other than the characteristic color, then the pixel value for the printed image that has been obtained from the LUT is returned 380 and this portion of processing for the pixel of interest ends 390.

If it is determined in decision block 330 that the color look-up was for a color that is the same, or close to, the characteristic color, then a counter is incremented in process block 340. Based on the counter, a test is then performed in decision block 350 to determine whether or not a threshold number of pixels that correspond to the characteristic color have been identified. If the threshold has not been reached, then the pixel value for the printed image that has been obtained from the LUT is returned 380 and this portion of processing for the pixel of interest ends 390.

If it is determined in decision block 350 that the threshold has been reached, then a suspicious document has been identified by the first level detector and a second level test 360 can be performed as will be described below. If the second level test 360 detects that the suspicious document is indeed a secure document then the value (or values) in the look-up table that corresponds to the characteristic color is modulated in process block 370 (as will be described below) to cause an incorrect color to be printed in place of the characteristic color. Then the modulated pixel value for the printed image that has been obtained from the LUT is returned 380 and this portion of processing for the pixel of interest ends 390. However, if the second level test 360 detects that the suspicious document is not a secure document, then the pixel value for the printed image that has been obtained from the LUT is returned 380 and this portion of processing for the pixel of interest ends 390.

Returning to the first level detection mechanism, a method suitable for use as the first level detection mechanism is one that counts the amount of a particular color that is used. The obverse of a US banknote is a characteristic green G, printed on a yellow substrate Y. Pixels of a counterfeit US note will either be this particular green G, the yellow Y, or a convex combination of the two: a G+(1−a) Y, for 0<a<1.

Alternatively, if the counterfeiter has obtained a supply of suitably colored paper, he might substitute white W, for yellow Y, in which case every pixel would be of the form a G+(1−a) W, for 0<a<1. In either case, there is a range of colors which might reasonably pass for banknote green, and use of a large number of pixels in this color green could be regarded as suspicious. This test can be performed using either a look-up table (LUT) especially designed for the purpose, or using one already in use in the printer, scanner or software pipeline.

Many devices use a LUT to convert between color spaces such as RGB and CMYK. In this case we identify that region of the LUT input space to which suspicious pixels belong. Then, along with the output of the LUT, we pass an extra parameter indicating whether the accessed color was in the suspicious region or not. If there is no LUT in use in the device pipeline, the specially designed LUT can have as output only the parameter indicating whether the input belongs to the suspicious region or not.

A counter is incremented each time the suspicious region is accessed, allowing a record to be kept of the number of times the suspicious color has been used. Once the counter exceeds a threshold, the document is classified as suspicious, and use of the second level detection mechanism can begin. For one embodiment, the threshold can be set to a certain percentage of the number of banknote green pixels that would appear in a counterfeit banknote (determined by the size of a banknote and the dot per inch (dpi) resolution of the scanner or printer).

The frequency with which the counter is compared to the threshold can be varied depending on implementation. For example, the comparison could happen: after every pixel, after every row of pixels, or only after every swath of rows.

Preferably, a counterfeit document should be classified as suspicious early enough in the process to allow the second level detection mechanism to operate effectively with the remainder. For example, if the second level detection mechanism required at least 50% of the suspected counterfeit to do its work accurately, we could set the threshold T, at 25%, and compare the counter and threshold over swaths of several rows. If the second level mechanism, however, required 75% of the suspected counterfeit to examine, the threshold might be set at 20%, and more frequent examination of the counter might be appropriate. Provided this first level detection has negligible performance impact, the only documents that will experience perceptible delay are those that use above the threshold amount of the suspicious color banknote green.

For banknotes of other countries, and other secure documents, one can apply the same technique as a first-level detection mechanism by carefully identifying a color, or set of colors that are required to accurately print the document. For example, a Peruvian 10000 Intis note (series 1988) has significant amounts of a characteristic cyan, a characteristic orange, and a characteristic green. If the total number of pixels of each of these colors that would be required to produce a counterfeit at a certain dpi is $A_0$, $A_1$ and $A_2$, then we can regard the document as suspicious when counters indicating the amounts of these colors used exceed respective thresholds $T_0$, $T_1$ and $T_2$.

In general, to protect a certain class of documents, we can select certain colors that are necessary to render a passable counterfeit, and maintain counts of the numbers of pixels being of, or close to, those colors. Exceeding the threshold for a single color need not be regarded as suspicious, however exceeding the threshold on all or most of the colors will cause the second level detection mechanism to be invoked.

Considerable freedom is available in choosing the colors of a particular document to be used in determining suspicion. Colors that commonly appear in large amounts on legitimate documents (e.g. skin tones, sky blue, grass, and black) make poor choices, while colors that are less common are good candidates. For some documents, detection of several different colors is better than reliance on detection of one color. For example, if each of seven different colors appears in amounts greater than threshold on legitimate documents with probability 0.1 (i.e., each color appears on about 10% of documents), appearance of all seven colors would occur in only one legitimate document in ten million (assuming independence).

Counting the suspicious colors can be performed using in a look-up table (LUT), either specially designed for the purpose, or already in use in the printer, scanner or software pipeline. If the LUT is already part of the pipeline, a parameter can be added to the output of the LUT to indicate when a suspicious region of the LUT input space has been accessed. If more than one color is being thresholded, one or more parameters can be returned by the LUT to indicate which color was detected. Note that if the LUT is designed only for this detection purpose, these parameters may be the only output of the LUT.

A counter is maintained for each of the suspicious colors, and is incremented each time the corresponding region of the LUT is accessed. The counters are compared with a set of thresholds. When all or most of the counters have exceeded their thresholds, the second level detection mechanism can be invoked. Provided that this first level detection causes negligible performance impact, the only documents that will experience perceptible delay will be those which exceed the threshold amount of each or most of the colors regarded as suspicious.

Implementation details of the first and second level detection mechanism will vary depending on the constraints of the device on which it is to implemented. Color conversion LUTs are commonly smaller than the input space of the image. That is, the LUTs do not contain an entry for every possible input, but have entries for some portion of the possible inputs, and have an interpolation algorithm to expand them. For example although the LUT for a 24-bit RGB image ideally ought to be 256 * 256 * 256, a far smaller table, say 30 * 30 * 30, will often suffice.

Even so, if memory size is critical, the LUT can consume considerable space. This factor is especially important when designing an ASIC. In such a case, the extra bit per entry needed to detect US currency, or the extra bits per entry needed to detect other currencies, might have a non-negligible cost impact on the detector. Because the bits added to the LUT in the first-level detection are not required to reproduce accurate colors, and are used merely to characterize regions of the LUT as being suspicious, it is possible to employ yet a smaller LUT, of size, say 6 * 6 * 6, that will be used exclusively for the detection of suspicious regions of color. This additional LUT will take far less memory space than would be needed to combine the color conversion and suspicious color detection functions into one LUT. Accesses to this table could be used before or after the accesses to the main color conversion LUT, or could be accessed in parallel, if the hardware or software architecture permits parallel computation.

Returning to the second level test, a example of a method suitable for the second level detection is one that detects some visible mark or geometric feature. As pointed out earlier, efficiency of this second (or higher) level detection mechanism is no longer as critical, because very few pages will ever be examined by this detector. Any scheme that detects any characteristic feature or series of features on the note will serve. A preferred characteristic of the second level detection mechanism is that, once the first-level detection has characterized the page as suspicious, there should still be a sufficient amount of the note remaining to be printed to permit the second level detection to make an unambiguous decision. However, alternatively, the second level detection could reprocess an entire document after it had been identified as suspicious by the first level detector.

The use of color detection as a first level filter for anti-counterfeiting of the US currency has nearly zero computational overhead: the detection is easily implemented in the color space conversion process, in which each element of the color lookup table is marked as either "suspicious" or "not suspicious", and an alarm is triggered when suspicious table elements are accessed a certain number of times. Although the approach is credited for its ease of implementation and virtually zero performance impact, it can potentially lead to a high false alarm rate. A typical case of concern is when an ordinary image with large areas of banknote green color (such as those generated by graphics applications) is printed. Such innocent actions will be deterred because of the inadvertent usage of the suspicious color.

In order to keep computational complexity low and to reduce the false alarm rate, multi-level detection may use a "cheap and dirty" detector as a quick first-stage gatekeeper. This first stage is sensitive enough to catch all counterfeiting actions, yet may incorrectly treat certain legitimate operations as suspicious. The suspected documents are then passed through secondary detectors, which can be much more complex, so that false detection is eliminated. The average detection time is still low because of the less frequent usage of the secondary detector.

One can form a very effective secondary detection approach in the case of US currency by exploiting the fact that the particular green color of US currency appears in an intermittent and consistent fashion. For one embodiment, processing is line-based, in accordance with the line-based page-rendering in printer drivers. The second level detector tests for a special occurrence pattern of banknote green on each line that matches that of the US currency. Note that the distribution of the banknote green spans a certain area on the currency. Therefore, any document that does not satisfy this distribution criterion should be eliminated.

Secondly, because of the extensive line drawings on the US currency, the banknote green does not appear continuously, instead it is frequently interrupted by the background yellow color. One can also differentiate by the behavior of such interruptions. Therefore a suspicious pattern is characterized by the size of the suspected area, and the frequency of the transition between the foreground green color and background yellow color.

Figure 4:
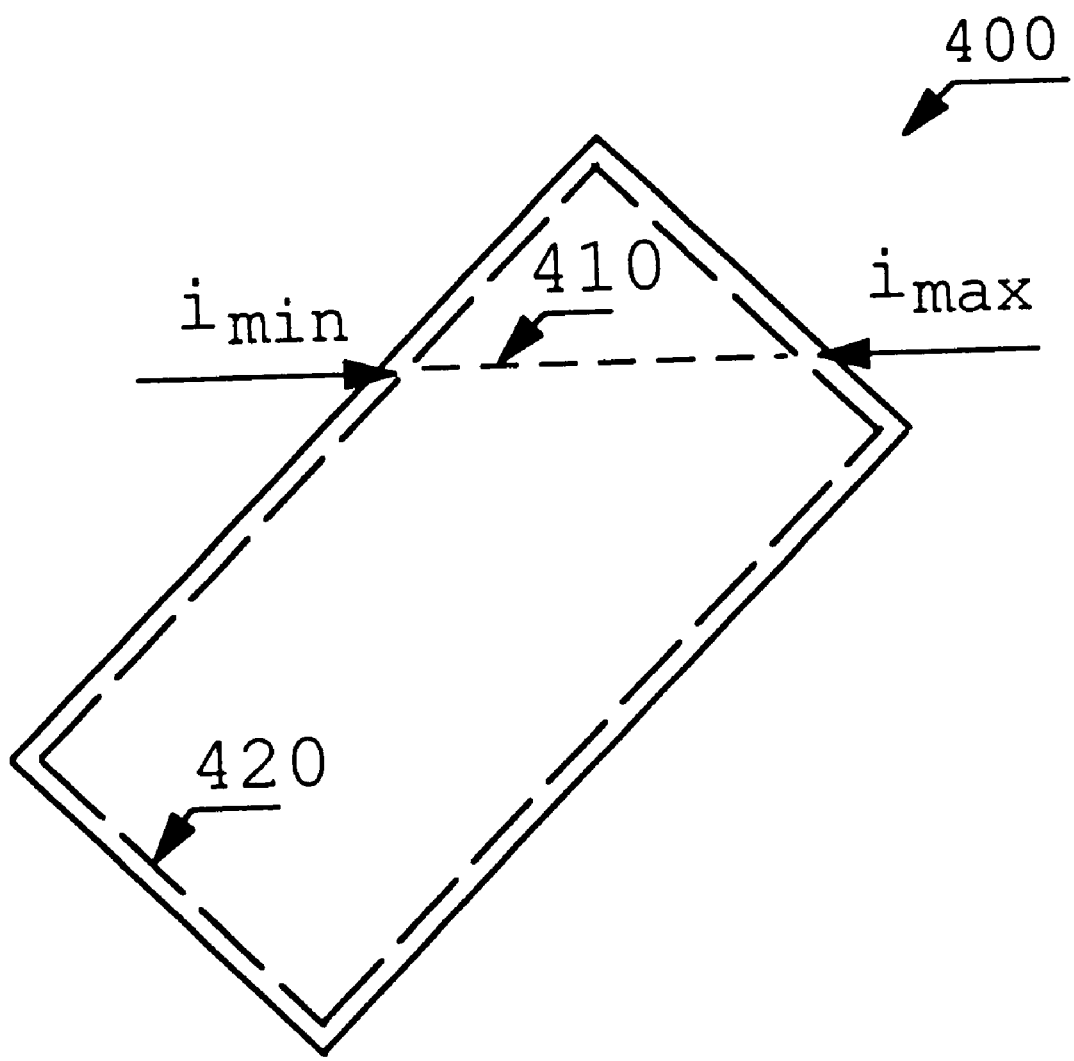
FIG. 4 is a diagram illustrating line-based color transition frequency testing of currency according to an embodiment of the present invention.

FIG. 4 is a diagram illustrating line-based color transition frequency testing of currency according to an embodiment of the present invention. In FIG. 4, currency note 400 has an image whose perimeter is defined by long-dashed border 420. Short-dashed line 410 represents one line I of the line-based rendering of currency 400. Specifically, let $i_{min}$ and $i_{max}$ denote the locations of the first and last occurrences of the suspicious color, and $N_i$ be the number of transitions between the foreground and background colors on line I. Then our criteria are, (I) The number of consecutive lines with $(i_{max}-i_{min})>T$ is more than L.

$$\frac{N_i}{(i_{max} - i_{min})} > S \quad \text{(ii)}$$

where the maximization and minimization is over all the lines in a document, and T, L, S are three thresholds. The first criterion puts a threshold on the minimum size of the green area. The second criterion restricts the average color transition frequency. The choice of T, L, S can be obtained from real dollar bill images, and should take into account possible different orientations of the bill when it is printed.

Figure 5:
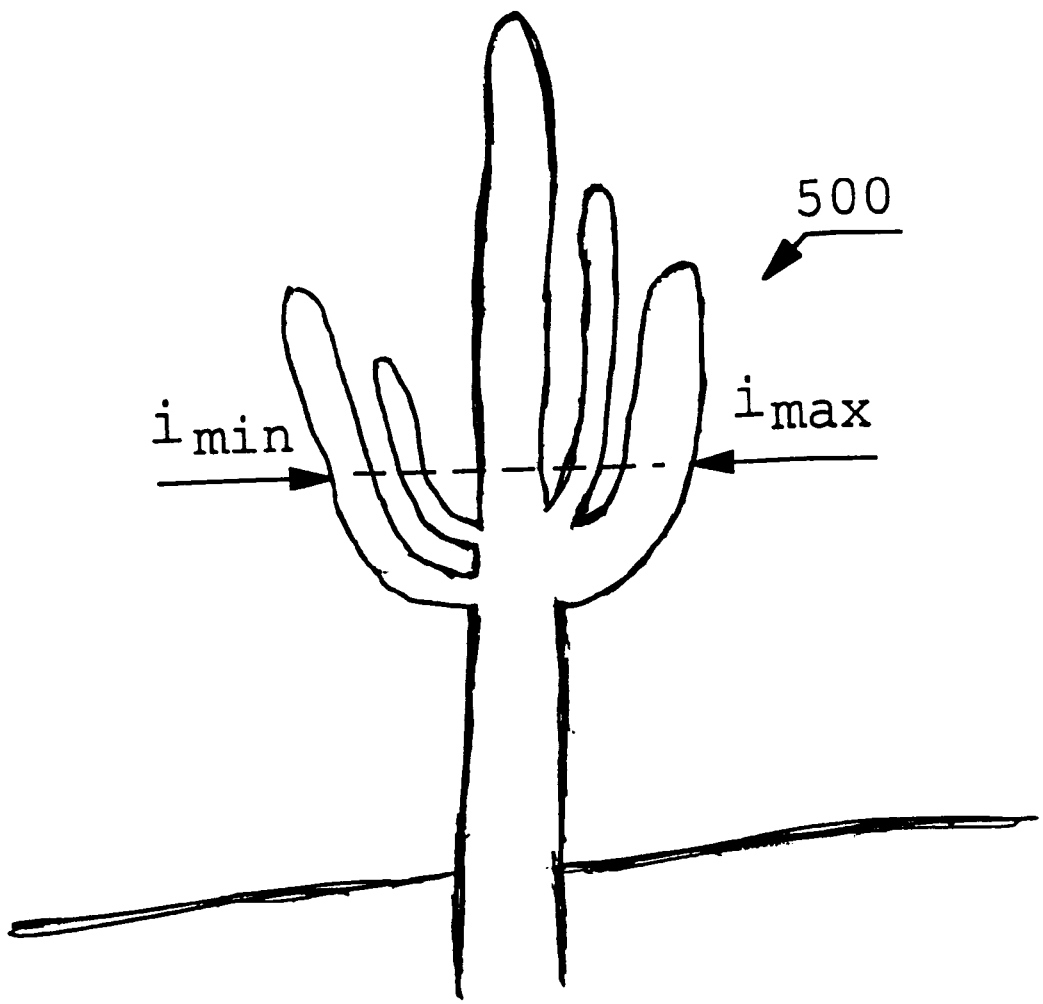
FIG. 5 is a diagram illustrating line-based color transition frequency testing of a natural image according to an embodiment of the present invention.

FIG. 5 is a diagram illustrating line-based color transition frequency testing of a natural image according to an embodiment of the present invention. If, in FIG. 5, natural image 500 is an image of a banknote green colored Saguaro cactus against a yellow colored background, then the first level color LUT test might identify the document as being suspicious. However, the second level line-based color transition frequency test would indicate that the image was not currency. This is because there are far fewer color transitions along the short-dashed line in FIG. 5 than would be the case with the lined drawings of currency.

Therefore, the cactus design and a dollar bill could both use suspicious amounts of banknote green. However, for the cactus, the suspicious green appears in separate, distinct areas with a uniform distribution of green inside each area. On the other hand, for the dollar bill, the suspicious green is distributed over the entire document with lots of fine drawings (high frequency patterns). These differences permit one to use the size and number of color transitions as a reliable, fast, second level detector.

Thus, the scheme we have described falls in two parts:
multi-level detection of suspicious events (e.g., detection of the use of banknote green in sufficient quantity and pattern); and
action taken as a consequence of the suspicious event (e.g., modulation of the green color delivered in the printed copy or denial of printing).

The former part of this scheme permits detection of currency notes or other documents having a characteristic color during image processing, for example, by a printer driver. The latter part of this scheme permits one to easily mark copied documents to decrease the likelihood of counterfeiting or even deny printing.

Although explicit schemes to detect visible features on U.S. or other notes are very possible, these schemes can often be computationally demanding. In contrast, the present invention, through its use of look-up tables, places negligible computational load on the driver for legitimate copying while allowing efficient detection and marking of attempted counterfeit notes.

Searching for visible features, such as the president's face, or the Treasury seal is a viable way of detecting currency at a secondary level. A problem with performing such tests without the filter is that the selected feature must be detected at any possible position and any possible angle. Searching for the feature can therefore take significant time. Without the first level filter, visible feature detection would generate considerable inconvenience for legal users, merely to obstruct the tiny percentage who may wish to counterfeit.

The present invention exploits the fact that the back of the U.S. notes are a characteristic green to identify these notes by detecting this green. Detection of this color would still not necessarily be a simple operation if it were carried out in RGB space. This is so, because one would have to explicitly calculate the distance of the color being rendered from "banknote green" and then determine if it were sufficiently close to be counted as suspicious. This distance would need to be calculated for each pixel (or at least for a large percentage of the pixels on the page).

Instead the present invention exploits the fact that the conversion from RGB to the CMYK used for printing is done in a Look-Up Table (LUT). Note that it represents almost no computational burden to alter the values in the LUT if there is the suspicion that a counterfeit is being made.

To simply change the values in the LUT that correspond to "banknote green" to another color would clearly make the work of the counterfeiter difficult, but this would generally be unacceptable. There is every possibility that this green will occur in general images, and if one replaced the CMYK that corresponds to "banknote green" with some other color it would generate unacceptably visible artifacts in general images.

An embodiment of the present invention exploits the fact that although general images may have some pixels of a characteristic color such as "banknote green", they will seldom have large amounts of this color in close proximity. In fact, very seldom will a document use as much of that green as is required to print the back of a banknote.

In rendering a page, each time an RGB triplet is converted to a part of the LUT that corresponds to "banknote green" (or some other characteristic color), a counter is increased. One can then degrade copying by modulating slightly the value of the green in a way that depends on the value of that counter.

Figure 6:
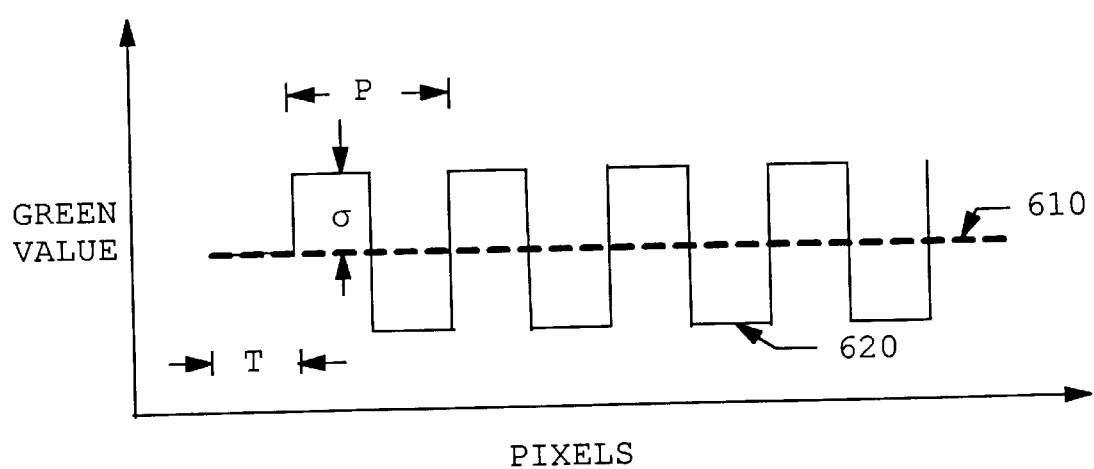
FIG. 6 is a diagram illustrating a color modulation function according to an embodiment of the present invention.

FIG. 6 is a diagram illustrating a color modulation function according to an embodiment of the present invention.

For example if we use a modulation function as shown in FIG. 6, then at first even banknote green (i.e., dotted line 610) is rendered correctly, i.e., until threshold T is exceeded and the second level test verifies that a counterfeit is being attempted. As the page uses more and more of the ink however, the modulation function causes a darker value than the actual green requested. Thus, when threshold T is exceeded, amplitude δ is added to the green value. After using a significant portion of the ink required to render a banknote, the modulation function switches again, and causes a lighter than requested green to be returned. This can be repeated, with a period of P as shown in the "Square wave" modulation function 620.

Figure 7:
FIG. 7 is a diagram illustrating a document having a modulated color according to an embodiment of the present invention.

The net effect of using this modulation function is that distinct bands will appear when an image of a banknote is printed. FIG. 7 is a diagram illustrating a document having a modulated color according to an embodiment of the present invention. This is shown in FIG. 7 wherein the finely shaded regions (e.g., 710) correspond to un-modulated regions in document 700 and the coarsely shaded regions (e.g., 720) correspond to regions that have had their color modulated. Note that visible marks may appear on the page independently of the orientation of the counterfeit notes.

Although a square wave modulation is shown in FIG. 7, other modulation schemes are possible. For example, the function could be a step, a ramp, a saw tooth, or sinusoidal. An advantage of a square wave is that there is no need to calculate a new modulation for each pixel. One merely changes the look-up table value each time the counter reaches a particular number. Furthermore, in regions where there are a lot of pixels having the characteristic color, the transition from one modulation value to another will be very noticeable. This will make it easy to identify counterfeit notes.

Furthermore, although the banknote is printed in a single color, when a banknote is scanned there will actually be a range of colors. This because each pixel of the scanner falls either completely over the background yellow color, completely on the foreground green, or is divided between the two. If the pixel is divided between the two, the color should be a linear combination of those two colors. In addition, as mentioned before, there is the possibility that instead of printing on white paper, a counterfeiter would print on yellow paper and would then alter the scanned note to make all colors a combination of white and green, rather than yellow and green. Both of these possibilities can be programmed into the suspicious region of the LUT space.

Note that should a counterfeiter print more than one banknote on the same page, the visible stripes will appear on all of the notes, although the frequency may increase with the number of notes.

Furthermore, if modulation of the look-up table is performed (for example, instead of denial of printer), the detection need not be perfect. If we consider a general image with a lot of green, we notice that the effect of the method is minimal. The reason the modulated colors of a general image are generally not visible is that although many pixels meet the criterion of being classified as "banknote green" in the LUT, they are dispersed and a minor increase or decrease in the value is not as noticeable as when a large amount of that ink is used in close proximity, as is the case on the back of a banknote.

It may be desirable to enhance the first level detection mechanism. For example as mentioned before, in the case of multi-color secure documents, although use of any of the programmed colors is not considered suspicious, collective use of above-threshold amounts of all, or most of them, is suspicious. Thus, independent events that occur with low probability and which are not in themselves suspicious (in this case the use of more than a threshold amount of a single particular color), can be used to trigger suspicion when a number of the events occur together.

We can also use color detection in combination with detection of geometric features. For example, a secure document can be designed with a geometric feature printed in an uncommon color. Once a certain amount of this color is detected, a local check for that feature or series of features can be carried out.

It should be clear that one could use various different actions when a suspicious event is found. One could refuse all further function by stopping the rendering process. In certain cases it may be desirable to deteriorate selectively the rendering, once the first level detection has classified a document as suspicious. This could occur in addition to, or instead, of the second level detection mechanism. Preferably, deterioration should affect aspects of the printer's capability that matter more for counterfeit copies than for legitimate documents. These include individual or combinations of the following:

Deliberate mis-rendering of color. Once a threshold amount of a suspicious color is detected, this color can be mis-rendered by modulating the color with a function of the amount used.

Deliberate mis-registration. Addition of a small, unpredictable jitter to the coordinates on the physical page from which rendering begins will make accurate registration between sides of the page extremely difficult.

Deliberate deterioration of halftoning. Substitution of a poorer quality dither matrix, or substitution of non-optimized weight for error diffusion will make reproduction of accurate detail more difficult.

To summarize, the present invention has the following advantages:

It causes negligible impact on time to render a page.

It has negligible effect on general images and documents, while generating visible artifacts on banknote images or denying their printing.

It can be deployed in the driver with no hardware changes.

The modulation function can be changed or fine-tuned; e.g. T, δ and P in the example we have shown can be adjusted.

The area of the LUT that is classified as suspicious can be adjusted to arrive at a compromise that allows reasonable detection, while giving minimal effect on legitimate users.

No redesign or reissue of currency is required. This method helps detect the existing currency circulation.

Furthermore, so long as the characteristic color does not change, no alteration is required for a new series of notes.

The many features and advantages of the invention are apparent from the written description and thus it is intended by the appended claims to cover all such features and advantages of the invention. Further, because numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method of deterring counterfeit reproductions of a document image, comprising the steps of:
   a) counting a number of document image pixels having a characteristic color within a pre-determined color range defined by a lookup table; and
   b) performing a color transition frequency test to confirm a counterfeit attempt, if the count exceeds a threshold.

2. The method of claim 1 further comprising the step of:
   c) degrading a reproduction of the document image, if the counterfeit attempt is confirmed.

3. The method of claim 2 wherein step c) further comprises the step of modulating the characteristic color within a reproduction of the document image to degrade the reproduction.

4. The method of claim 3 wherein modulation of the characteristic color is controlled by at least one of a square wave, a ramp, a sawtooth, and a sinusoidal modulation function.

5. The method of claim 2 wherein step c) further comprises the step of substituting an alternative color for the characteristic color within a reproduction of the document image to degrade the reproduction.

6. The method of claim 2 wherein step c) further comprises the step of degrading a halftoning of the reproduction.

7. The method of claim 2 wherein the reproduction is mis-registered during a reproduction process.

8. The method of claim 1 wherein the lookup table provides a colorspace conversion between RGB and CMYK colorspace.

9. The method of claim 1 wherein step b) further comprises the steps of:
i) detecting a first ($i_{min}$) and a last ($i_{max}$) occurrence of a selected characteristic color along each of a plurality of lines through the image; and
ii) counting a number of consecutive lines, $C_L$ for which $\{i_{max}-i_{min}\}$ exceeds a size threshold, T.

10. The method of claim 9 further comprising the step of:
iii) confirming a counterfeit attempt, if $C_L>L$ and $$\frac{N_i}{i_{max} - i_{min}} > S$$

for each line, wherein L is a pre-determined line count threshold, wherein $N_i$ is a number of transitions between foreground and background colors along a selected line, i, wherein S is a color transition frequency threshold.

11. A method of deterring counterfeit reproductions of an document image, comprising the steps of:
a) performing a colorspace conversion from a first colorspace to a second colorspace for each pixel of the document image in accordance with a lookup table;
b) counting each lookup of any characteristic color within the image, wherein each characteristic color is within a pre-determined range of the lookup table; and
c) performing a color transition frequency test to confirm a counterfeit attempt, if a count for at least one characteristic color exceeds a threshold.

12. The method of claim 11 wherein the first colorspace is RGB, wherein the second colorspace is CMYK.

13. The method of claim 11 wherein step c) further comprises the steps of:
i) detecting a first ($i_{min}$) and a last ($i_{max}$) occurrence of a selected characteristic color along each of a plurality of lines across the image; and
ii) counting a number of consecutive lines, $C_L$ for which $\{i_{max}-i_{min}\}$ exceeds a size threshold, T.

14. The method of claim 13 further comprising the step of:
iii) verifying a counterfeit attempt, if $C_L>L$ and $$\frac{N_i}{i_{max} - i_{min}} > S$$

for each line, wherein L is a pre-determined line count threshold, wherein $N_i$ is a number of transitions between foreground and background colors along a selected line, i, wherein S is a color transition frequency threshold.

15. The method of claim 11 further comprising the step of:
d) degrading a reproduction of the document image, if the counterfeit attempt is confirmed.

16. The method of claim 15 wherein step d) further comprises the step of modulating at least one characteristic color within a reproduction of the document image.

17. The method of claim 16 wherein modulation of the characteristic color is controlled by at least one of a square wave, a ramp, a sawtooth, and a sinusoidal modulation function.

18. The method of claim 15 wherein step d) further comprises the step of substituting an alternative color for at least one characteristic color within a reproduction of the document image.

19. The method of claim 15 wherein step d) further comprises the step of degrading a halftoning of the reproduction.

20. The method of claim 15 wherein step d) further comprises the step of mis-registering the reproduction during reproduction.

* * * * *